United States Patent [19]
Blanc et al.

[11] Patent Number: 5,512,372
[45] Date of Patent: Apr. 30, 1996

[54] EPOXY RESIN COMPOSITION AND APPLICATIONS, IN PARTICULAR IN COMPOSITE STRUCTURES, USING IMIDAZOLE/POLYAMINE MIXTURE

[75] Inventors: Isabelle Blanc, Lyon; Françoise Eyriey, St. Priest; Xavier Gambert, Villeurbanne, all of France

[73] Assignee: Brochier, S.A., Decines, France

[21] Appl. No.: 256,376

[22] PCT Filed: Jan. 13, 1993

[86] PCT No.: PCT/FR93/00032

§ 371 Date: Aug. 24, 1994

§ 102(e) Date: Aug. 24, 1994

[87] PCT Pub. No.: WO93/14136

PCT Pub. Date: Jul. 22, 1993

[30] Foreign Application Priority Data

Jan. 15, 1992 [FR] France ............................ 92 00368

[51] Int. Cl.$^6$ .................... C08G 59/44; C08G 59/50; C08G 65/00
[52] U.S. Cl. .................... 428/413; 528/94; 528/117; 528/120; 525/113; 525/504; 525/534; 525/535; 427/386
[58] Field of Search .................... 528/94, 117, 120; 525/504, 113, 534, 535; 428/413; 427/386

[56] References Cited

U.S. PATENT DOCUMENTS

| | | | |
|---|---|---|---|
| T869,009 | 12/1969 | Frank | 528/120 |
| 3,489,695 | 1/1970 | Green | 528/117 |
| 3,536,654 | 10/1970 | Lantz et al. | 528/117 |
| 4,423,094 | 12/1983 | Dearlove et al. | 427/386 |

FOREIGN PATENT DOCUMENTS

| | | |
|---|---|---|
| 2041977 | 2/1971 | France . |
| 2065185 | 6/1971 | France . |
| 2049541 | 6/1971 | Germany . |
| 1300981 | 12/1972 | United Kingdom . |

OTHER PUBLICATIONS

Chemical Abstracts, vol. 85, No. 6, abstract No. 34750q, "Powdered Epoxy Resin Compositions for Coating Materials".

*Primary Examiner*—Frederick Krass
*Attorney, Agent, or Firm*—Morgan & Finnegan

[57] ABSTRACT

Hardenable or polymerizable epoxy resin-based composition, characterized in that its hardener system comprises a combination in synergic quantities of:

(i) at least one imidazole which, alone, can cause the polymerization of the epoxy resin only at a temperature above about 75° C., (ii) at least one polyamine compound which, alone, leads to the polymerization of the epoxy resin at a temperature lower than about 75° C. Such a resin is particularly suitable for the manufacture of composite structures, applicable in particular in ship- or boatbuilding.

17 Claims, No Drawings

EPOXY RESIN COMPOSITION AND APPLICATIONS, IN PARTICULAR IN COMPOSITE STRUCTURES, USING IMIDAZOLE/POLYAMINE MIXTURE

The invention belongs to the field of epoxy resin compositions or formulations, more particularly intended for the impregnation of textile reinforcements or the production of films, applicable to the manufacture of composite structures.

It is well known in the art that epoxy resin compositions have a very valuable application in binding or impregnating various materials, such as fibrous textures, cellular materials, for example rigid, semi-rigid or flexible foams, as well as other semi-worked reinforcement materials, such as honeycombs. The manufacturing techniques for composite structures are also known. Often pre-impregnated materials are used with a resin of the same type as that used in the manufacture of the final composite structure. Practical conditions of molding are fairly varied. In fact, there are resin systems for high or low pressure molding, for example under partial vacuum, to improve the resin penetration into the reinforcement.

Other systems are used following the technique known as "contact stratification". In this case the successive reinforcement layers are impregnated as they are placed in the mold, and no pressure is necessary during polymerization. All these concepts are well known in the art, and thus need not be further described.

The person skilled in the art however knows that it is difficult to formulate epoxy resin compositions having all the properties desirable for the manufacture of composite structures. Among the parameters considered to be important, the first is the lifetime of the resin system. By lifetime should be understood the maximum time interval, guaranteed by the supplier of the resin or the reinforcement pre-impregnated with resin, during which the product is suitable for producing a composite structure, that is to say retains its handling properties and its mechanical performance after polymerization or hardening. This parameter is very important, in particular if very large articles requiring long handling periods are to be manufactured, above all if the temperature is relatively high, for example from 25° to 30° C.

Another parameter is the behavior in a humid environment of the composite structure after polymerization.

It is characterized by the quantity of water able to be absorbed by the composite and also by the thermomechanical properties of the latter (such as the glass transition temperature, for example) once the degree of saturation has been reached under the humidity conditions considered.

For the production of structures known as "sandwiches", the resin composition must also have good adhesion properties to the reinforcements, such as the synthetic foams and honeycombs which are often used in such structures.

It is also desirable that the epoxy resin composition is able to be molded under relatively mild conditions, that is at low pressure and moderate temperature.

To the knowledge of the applicant, none of the epoxy-based resin systems currently existing fulfills all the conditions stated above for the production of composite structures. The known systems for contact stratification have a very short lifetime (a few hours) and poor performance in a humid environment. The systems known as "Wet-Dregs" only have a lifetime of a few days and their properties under humid conditions are poor. Other existing epoxy resin-based compositions have a satisfactory lifetime but their polymerization or hardening must be carried out at relatively high temperatures (for example above 85° C.). They only weakly adhere to reinforcements such as foams or honeycombs, and their performance in a humid environment remains poor.

Below are listed documents illustrating the prior art in the field of the invention.

U.S. Pat. No. 4.423.094 describes an epoxy resin composition intended to be applied to tools in order to give them an improved surface resistance. One such composition contains to this end a filler of very high hardness. Its hardening is achieved in the conventional way by carrying out successive reactions of an aliphatic amine at ambient temperature, then an imidazole at a high temperature. The two hardeners react one after the other and the resin properties do not fulfill all the previously described requirements.

Patent FR-A-2.041.977 relates to the production of molded epoxy resin articles by a process involving the successive use of two hardeners, a first molding operation at low temperature giving a flexible molded object, which is then removed from the mold and subjected to heat treatment at a higher temperature to give a rigid solid. This two-stage process results in completely hardened products.

Patent FR-A-2.065.185 has as object an epoxy resin composition intended for powdered coating materials and containing a single hardener of the polyamine type, which must be heated to between 120° and 160° C. to become active. Such a hardener system does not allow temperatures below 100° C. to be used and the resins obtained do not comply with all the requirements described earlier.

Patent JP-A-76.037.152, cited in Chemical Abstracts, vol. 85, No. 6, Aug. 9, 1976, page 97, reference 85-347,509, relates to compositions of powdered epoxy resins. The hardener system comprises two components with different reaction temperatures, which react successively in the preparation of the resin. The final curing takes place at a high temperature (165° C.) on the powdered resin which is deposited electrostatically onto metallic substrates. The hardening conditions are designed for such an application and necessarily involve high temperatures. In addition the problems of stability at ambient temperature are not confronted, since these do not arise for powdered resins used as coating films.

The present invention relates to an epoxy resin formulation or composition, which enables all the practical requirements for manufacture of composite structures to be satisfied simultaneously, while at the same time giving mechanical properties at least equal to those provided by existing compositions to these structures.

An object of the invention is to supply an epoxy resin composition whose lifetime in its final form is longer than 21 days.

The invention also has the object of such a composition characterized by a glass transition temperature, after polymerization, greater than 80° C. after saturation in a humid atmosphere.

Another object of the invention is an epoxy resin composition which has good adhesion capacity, after polymerization, on reinforcements such as synthetic foams or honeycombs, so as to be able to produce sandwich structures.

The invention in addition has the object of such a composition which can be suitable for the manufacture of composite structures under moderate conditions, that is under low pressure (in particular under an absolute pressure of 0.4 to 0.9 bar) and at moderate temperature (of the order of 75° C., or a little higher, without exceeding 120° C.).

These objects, as well as those appearing in the following description, are achieved by a hardenable or polymerizable epoxy resin, characterized in that its hardener system comprises a combination in synergic quantities of:

(i) at least one imidazole which, alone, can cause the polymerization of the epoxy resin only at a temperature above about 75° C., (ii) at least one polyamine compound which, alone, leads to the polymerization of the epoxy resin at a temperature lower than about 75° C.

The epoxy resin making up the base of the composition according to the invention can be selected from one or more resins currently used for the manufacture of composite structures. In this respect, the book Engineered Material Handbook Vol. 1, pp. 66–69, Ed ASM International (1987), may be referred to.

Most generally the epoxy base represents from about 50% to 95% by weight of the composition, preferably between about 65% and 90% by weight. The epoxy base can consist of a single resin, or it can be a mixture of mutually compatible epoxy resins.

The epoxy resin or resins can also contain an additive known in the art to improve the flexibility and/or the adhesion capacity to various materials. These additives can in particular be thermoplastic aromatic polymers (for example polysulfones, polyether-sulfones) or non-aromatic polymers (for example vinyl acetate copolymers) and/or elastomers (for example butadiene copolymer-type) and/or other compounds known to be compatible with epoxy resins.

The epoxy resins preferred for the compositions of the invention are the DGEBA (diglycidyl ether of bisphenol A) or the novolacs (polyglycidyl ether of phenol-formaldehyde novolac).

The originality of the composition of the invention lies essentially in the nature of its hardener system. This, as stated earlier, is a combination, in synergic quantities, of the two constituents (i) and (ii) described above.

The first constituent belongs to the family of the imidazoles or their substituted derivatives. Such products are already known and used with epoxy resins to give materials with good thermal behavior. In this respect the book referred to above on epoxy resins and the Japanese patent SEO 56-148210 may be referred to.

The second constituent is selected from among the polyamine compounds able to bring about the hardening of epoxy resins at a temperature below 75° C.

Such compounds are well known: aromatic or cycloaliphatic amines, or amines modified for example by a polyether group, and preferably a compound whose lifetime mixed with epoxy resins is compatible with the requirements stated above.

A compound which has proved satisfactory is the product commercially available under the name of ANCAMINE 2014 (ANCHOR CHEMICAL).

Used alone, the amine does not allow the production of composite structures simultaneously having all the advantageous properties described above.

The hardener system of the composition of the invention can also contain other epoxy resin hardeners known in the art, such as for example aromatic or aliphatic amines or anhydrides (see Engineered Materials Handbook, referred to above).

However, if one or more of these hardeners is used, it is only acting as an additive and is thus present in a substantially lower quantity than that normally used to achieve resin hardening.

According to the teaching of the present invention, it is the two-component hardener system which mainly carries out the polymerization of the epoxy resin.

The relative proportions of the first and second constituents of the hardener system are selected so as to impart synergic properties to the epoxy resin. The two constituents together represent the complement to 100% by weight of the quantity of the epoxy base. Taking the above information into account, the quantity of hardener system thus represents about 5% by weight to 50% by weight of the total composition, the range of from 10% to 35% by weight being preferred.

The relative proportions of the first and second constituents of the hardener system can vary according to the nature of said constituents and of the epoxy resin. Generally for 100 parts by weight of the hardener system, from about 3 to 70 parts of constituent (i) are used, preferably from about 25 to 70 parts, the balance to 100 being formed by constituent (ii).

It has been found that the combination of the two abovementioned constituents, of which one has a hardening temperature above 75° C. with epoxy resins, while the other has a hardening temperature below 75° C. with the same resin, gives a remarkable synergic effect.

The lifetime of the formulated composition is longer than 21 days, and in general at least one month, which gives it a long period of use in the factory, and allows molding of very large structures without risk of change in viscosity.

Its behavior in a humid atmosphere is exceptional: when the resin composition is used for the production of stratified structures, its uptake of humidity does not exceed 1% by weight (after ageing in water at 70° C. for 14 days, standard ISO 75), so that the performance of the composite structure after ageing is practically unaltered. This property is particularly attractive for applications in the shipbuilding industry.

The epoxy resin compositions according to the invention enable composite structures to be manufactured by lowpressure molding (in particular at 0.4 to 0.9 bar absolute) and at moderate temperatures (in particular in the range 75° to 120° C.). Their adhesive qualities permit direct fixing to structures of the foam or honeycomb type.

The mechanical properties of the composite structures, such as the stratified structures, obtained from the compositions of the invention, are at least equal to those which can be achieved with resins currently available for this purpose.

A particularly advantageous application of the new epoxy resins consists of the manufacture of stratified structures, in particular those based on fibrous reinforcements, with a view to manufacturing pre-impregnated materials for producing composite structures particularly useful in ship- and boatbuilding.

In the present description, the expression "fibrous reinforcements" denotes all types of woven and/or nonwoven textile reinforcements comprising conventional and/or synthetic and/or technical textile materials, such as glass, polyester, polyamide, aramid, carbon, silicon and others.

Reinforcements other than fibrous materials, intended for the production of composite structures with the resins of the invention, can be selected from any of the reinforcements known in the art for this purpose. They can be, for example, polyurethane foams, polyvinyl chloride, as well as honeycomb structures based on polyolefins, aluminum, or aramid fibers.

Because of its long lifetime, the composition of the invention can be formulated with its two constituents and supplied complete to an end user. This property is particularly advantageous for pre-impregnated products or "prepregs".

In their application to composite structures, the new epoxy resins of the invention can be used for impregnation and/or as glue films.

The invention will be additionally illustrated, without in any way being limited, by the following examples, in which the amounts and proportions are given by weight.

EXAMPLE 1 (comparison)

In 100 parts of DGEBA (LY 556, CIBA-GEIGY) epoxy resin, epoxy equivalent 190 g, were mixed 7 parts of dicyandiamide and 4 parts of 3-(3,4-dichlorophenyl)-1-dimethyl urea (or diuron).

The mixture obtained was deposited on glass fiber fabric so as to obtain a pre-impregnated material containing 40% by weight of resin.

This pre-impregnated material was kept at ambient temperature and the changes in its pegocity (and thus of its capacity to be transformed) with time were observed.

After one month at ambient temperature, the pegocity was observed to be still acceptable.

On the other hand, the polymerization of such a product could only take place at a temperature above 90° C.

EXAMPLE 2 (comparison)

A product similar to that in example 1 was prepared but replacing the DGEBA type epoxy resin by a novolac (EPN 1938, CIBA-GEIGY) to which 7 parts of dicyandiamide and 2 parts of diuron had been added.

The pre-impregnated material obtained had practically the same lifetime and hardening properties as in example 1.

EXAMPLES 3, 4, 5

The same procedure was used as for examples 1 and 2 but using a hardener system according to the invention and according to the conditions listed in Table I.

The pre-impregnated materials obtained had a lifetime of over one month and could be polymerized from 75° C.

Table II gives the properties of the commercial resin systems and pre-impregnated materials which have a polymerization temperature below or equal to 75° C. but with a very short lifetime. It also lists the values corresponding to the compositions of the examples.

Table III compares examples 1 and 2 (controls) with examples 3 to 5 carried out according to the invention.

It can be seen that the results obtained for examples 3 to 5 are much better than those obtained with a conventional hardener system:

- the uptake of water is divided by at least 2,
- the glass transition temperature after humid ageing is appreciably higher.

The foregoing examples illustrate the use of the compositions of the invention with glass fiber fabrics allowing in particular the production of composite structures by contact stratification. The hardener system of the invention has also been applied to carbon fiber fabrics as well as to glass/carbon fiber fabrics and the observations made were similar to those already obtained for the glass fiber fabrics.

TABLE I

| | Compositions by weight of the examples | | | | | |
|---|---|---|---|---|---|---|
| | DGEBA 190 g/eq | Novolac 180 g/eq | dicyandiamide | diuron | ANCAMINE 2014 | 2MZ-Azine* |
| Example 1 | 100 | | 7 | 4 | | |
| Example 2 | | 100 | 7 | 2 | | |
| Example 3 | 100 | | | | 5 | 8 |
| Example 4 | 100 | | | | 35 | 13 |
| Example 5 | 50 | 50 | | | 15 | 4 |

*Commercial name of 2-[β-(2'methylimidazoyl-(1')]-ethyl-4,6-diamino-s-triazine; product manufactured by Shikoku Chemicals Corporation (Japan)

TABLE II

Comparison of lifetimes

| Product | Lifetime Ambient temperature | Minimum polymerization temperature |
|---|---|---|
| XB5082 + XB5083* | 3 h | 25° C. |
| CYCOM 753** | 72 h | 45° C. |
| AMPREG 75*** | 72 h | 75° C. |
| Examples 3 to 5 | >1 month | 75° C. |
| Examples 1 and 2 | >1 month | 90° C. |

*Resin marketed by Ciba-Geigy France (Division matières plastiques)
**Resin manufactured by American Cyanamid (USA) and distributed by Solution Composite Ltd, Cowes (England)
***Resin manufactured by Structural Polymer Systems Ltd, Cowes (England)

TABLE III

Comparison of the water resistance of the pure resins

| | Curing cycle | Water uptake (1) | Glass transition (2) |
|---|---|---|---|
| Example 1 | 24 h at 75° C. | *** | *** |
| | 2 h at 120° C. | 4.9% | 81° C. |
| Example 2 | 24 h at 75° C. | *** | *** |
| | 2 h at 120° C. | 4.4% | 97° C. |
| Example 3 | 24 h at 75° C. | 1.8% | 96° C. |
| | 2 h at 120° C. | 1.3% | 112° C. |
| Example 4 | 24 h at 75° C. | 2.0% | 102° C. |
| | 2 h at 120° C. | 1.9% | 102° C. |
| Example 5 | 14 h at 75° C. | 2.0% | 105° C. |
| | 2 h at 120° C. | 1.8% | 107° C. |

***no polymerization
(1): according to ISO 75, 14 d at 70° C.
(2): measured on DMA 983 (DuPont) beginning of decrease of elastic modulus There now follows a see of data specifications for a resin according to the invention, able to be obtained according to Examples 3 to 5.

| Storage | | |
|---|---|---|
| Conservation | 23° C. | 1 month |
| | −18° C. | 12 months |

Properties on Stratified Structures

Curing cycle: 24 h at 75° under 0.9 bar vacuum.

Mechanical properties (on equilibrated glass fiber tissue 300/mg$^2$).

TABLE IV

|  | As manufactured | | After humid saturation | |
| --- | --- | --- | --- | --- |
|  | 23° C. | 70° C. | 23° C. | 70° C. |
| C.I.L.* | 45 MPa | 36 MPa | 44 MPa | 35 MPa |

*C.I.L. = Resistance to interlaminar shearing according to ASTM D 2344-84

Glass transition (DMA: decrease of elastic modulus) After immersion for 14 days in water at 70° C.: Tg=98° C. Water uptake: 0.9%

| Properties of the pure resin | |
| --- | --- |
| Glass transition temperature Tg (DMA method: decrease of elastic modulus) | |
| Curing cycle: | 2 h at 120° C. |
| Tg as manufactured: | 130° C. |
| Tg aged (1): | 117° C. |
| Water uptake (1): | 1.6% by weight |
| Density: | 1.2 |
| Results of bending tests | |
| Stress: | 120 MPa |
| Modulus: | 2800 MPa |
| Extension: | 4% |

(1): immersion in water 14 days at 70° C.

TABLE V

| Gel and polymerization times as a function of temperature | | |
| --- | --- | --- |
| Temperatures (°C.) | Gel times (min) | Polymerization (h) |
| 75 | 180 | 24 |
| 85 | 90 | 12 |
| 120 | 5 | 2 |

We claim:

1. A hardenable or polymerizable epoxy composition comprising an epoxy resin and about 5 to about 50 wt % of a hardener based on the total weight of the composition, said hardener including the combination of:
   (i) at least one imidazole that only polymerizes said epoxy resin at temperatures above 75° C.; and
   (ii) at least one polyamine that only polymerizes said epoxy resin at temperatures below 75° C.; said composition having a lifetime of at least 21 days and being polymerizable in a single step at 75° C.

2. The composition according to claim 1, wherein from 50 to 95 wt % epoxy resin, based on the total weight of said composition, is present.

3. The composition according to claim 1, wherein from 65 to 90 wt % epoxy resin, based on the total weight of said composition, is present.

4. The composition according to claim 1, wherein said epoxy resin is a single resin.

5. The composition according to claim 1, wherein said epoxy resin comprises a mixture of mutually compatible epoxy resins.

6. The composition according to claim 1, further including a flexibility and/or adhesion capacity promoting additive that is compatible with said epoxy resin, said additive being selected from thermoplastic aromatic polysulfone polymers, thermoplastic aromatic polyether-sulfone polymers, vinyl acetate copolymer, butadiene copolymers, elastomers or non-aromatic polymers.

7. The composition according to claim 1, wherein said epoxy resin is selected from a diglycidyl ether of bisphenol A resin or a polyglycidyl ether of phenolformaldehyde novalac.

8. The composition according to claim 1, wherein said polyamine is aromatic or cycloaliphatic.

9. The composition according to claim 1, wherein from 10 to 35 wt % hardener, based on the total weight of said composition, is present.

10. The composition according to claim 1, wherein said hardener is about 3 to 70 parts imidazole and the balance is said polyamine, based upon 100 parts of said hardener.

11. A hardenable or polymerizable epoxy composition comprising an epoxy resin and about 5 to about 50 wt % hardener, based on the total weight of the composition, said hardener including:
   (i) at least one imidazole that only polymerizes said epoxy resin at temperatures above 75° C.; and
   (ii) at least one polyamine that only polymerizes said epoxy resin at temperatures below 75° C.;
   and said composition having:
   (iii) a lifetime of at least 21 days;
   (iv) a humidity uptake less than 1% based upon aging in water at 70° C. for 14 days in accordance with standard ISO 75;
   (v) moldability at pressures from about 0.4 to 0.9 bars absolute; and
   (vi) adhesiveness to foams formed from polyurethane or polyvinyl chloride, or honeycombs formed from aluminum, polyolefins or aramid fibers; and permitting single step polymerization at temperatures from 75° C. to 120° C.

12. A process for forming a composite structure, comprising the steps of:
   (i) providing a composite material;
   (ii) adding the composition of claim 1 to a composite material of step (i) to form a intermediate product; and
   (iii) curing or polymerizing the intermediate product of step (ii) to form a composite structure.

13. A process for forming an epoxy containing substrate comprising the steps of:
   (i) providing a substrate material that is formed from a material selected from polyester, polyamide, aramid, carbon, silicon or glass, said substrate being woven or non-woven;
   (ii) applying the composition of claim 1 to a surface of said substrate material; and
   (iii) impregnating said substrate material with said applied composition of step (ii).

14. An epoxy containing substrate comprising,
   (i) a substrate material selected from polyester, polyamide, aramid, carbon, silicon or glass and being woven or non-woven; and
   (ii) a hardenable or polymerizable epoxy composition comprising an epoxy resin and about 5 to about 50 wt % hardener, based on the total weight of the composition, said hardener including:
      (a) at least one imidazole that only polymerizes said epoxy resin at temperatures above 75° C.; and (b) at least one polyamine that only polymerizes said epoxy resin at temperatures below 75° C.;

said composition having a lifetime of at least 21 days and being polymerizable in a single step at 75° C.

15. The substrate according to claim 14, wherein said composition is impregnated into said substrate.

16. The substrate according to claim 14, wherein said composition is a coating on a surface of said substrate.

17. A laminate comprising at least two epoxy containing substrate layers according to claim 14 that are superimposed and laminated together.

* * * * *